United States Patent [19]

Pilatowicz et al.

[11] Patent Number: 4,860,451
[45] Date of Patent: Aug. 29, 1989

[54] STRING TRIMMER

[75] Inventors: Edward J. Pilatowicz, Los Angeles; Leonid Zatulovsky, Arleta, both of Calif.

[73] Assignee: Allegretti & Company, Chatsworth, Calif.

[21] Appl. No.: 935,042

[22] Filed: Nov. 28, 1986

[51] Int. Cl.⁴ .............................................. B26B 7/00
[52] U.S. Cl. .......................................... 30/276; 56/12.7
[58] Field of Search ................... 30/276, 347; 56/12.7

[56] References Cited

U.S. PATENT DOCUMENTS

| | | | |
|---|---|---|---|
| 4,151,646 | 5/1979 | Lane | 30/276 |
| 4,168,572 | 9/1979 | Ewing | 30/276 |
| 4,188,719 | 2/1980 | Hoff | 30/276 X |
| 4,236,311 | 12/1980 | Mitchell | 30/276 |
| 4,237,610 | 12/1980 | Bradus et al. | 30/276 |
| 4,254,550 | 3/1981 | Satoh | 30/276 |
| 4,285,128 | 8/1981 | Schnell et al. | 30/276 |
| 4,362,074 | 12/1982 | Kwater | 83/13 |
| 4,419,822 | 12/1983 | Harris | 30/276 |
| 4,426,780 | 1/1984 | Foster | 30/276 |
| 4,483,069 | 11/1984 | Moore | 30/276 |
| 4,490,910 | 1/1985 | Mattson et al. | 30/276 |
| 4,557,052 | 12/1985 | Baba et al. | 30/276 |
| 4,561,180 | 12/1985 | Pittinger | 30/276 |
| 4,584,771 | 4/1986 | Tillotson | 30/276 |
| 4,599,796 | 7/1986 | Baba | 30/276 |
| 4,672,798 | 6/1987 | Ota | 56/12.7 |

FOREIGN PATENT DOCUMENTS 2816751 10/1978 Fed. Rep. of Germany ........ 30/276

Primary Examiner—Frank T. Yost
Assistant Examiner—Willmon Fridie, Jr.
Attorney, Agent, or Firm—Lyon & Lyon

[57] ABSTRACT

A string trimmer which can be operated with one hand is disclosed. A drive motor is disposed at an upper end of the string trimmer and is connected to a string trimmer head through a flexible drive system disposed in a tubular housing between a motor housing and a trimmer head or spindle housing. A handle is provided which extends forwardly and slightly inclined downwardly from the motor housing and is suitably elongated and positioned so as to allow users of different heights to conveniently hold and operate the trimmer, usually with one hand. A detachable assist handle can be pivotally attached to the handle/motor housing structure to facilitate lifting and guiding the string trimmer.

13 Claims, 3 Drawing Sheets

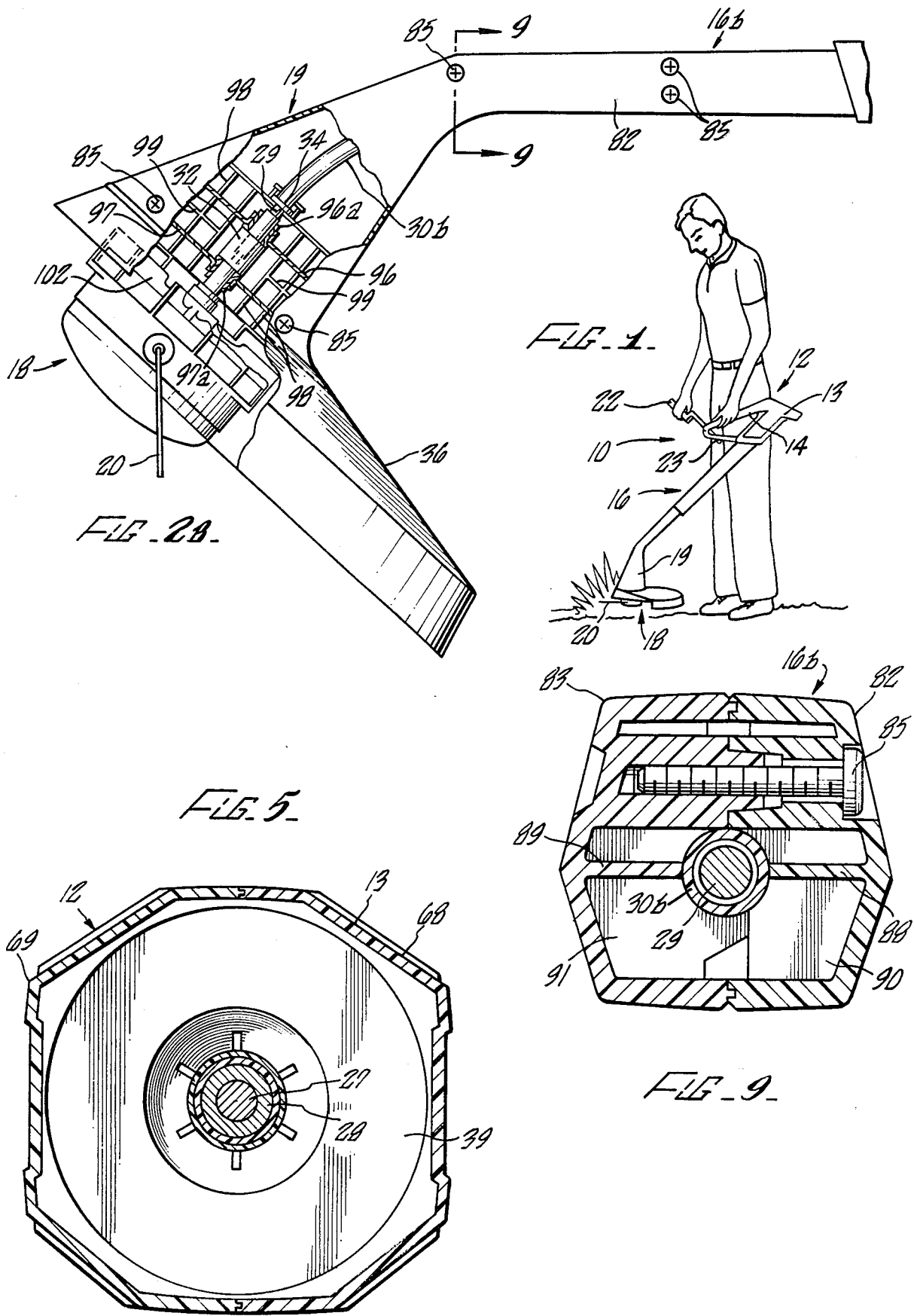

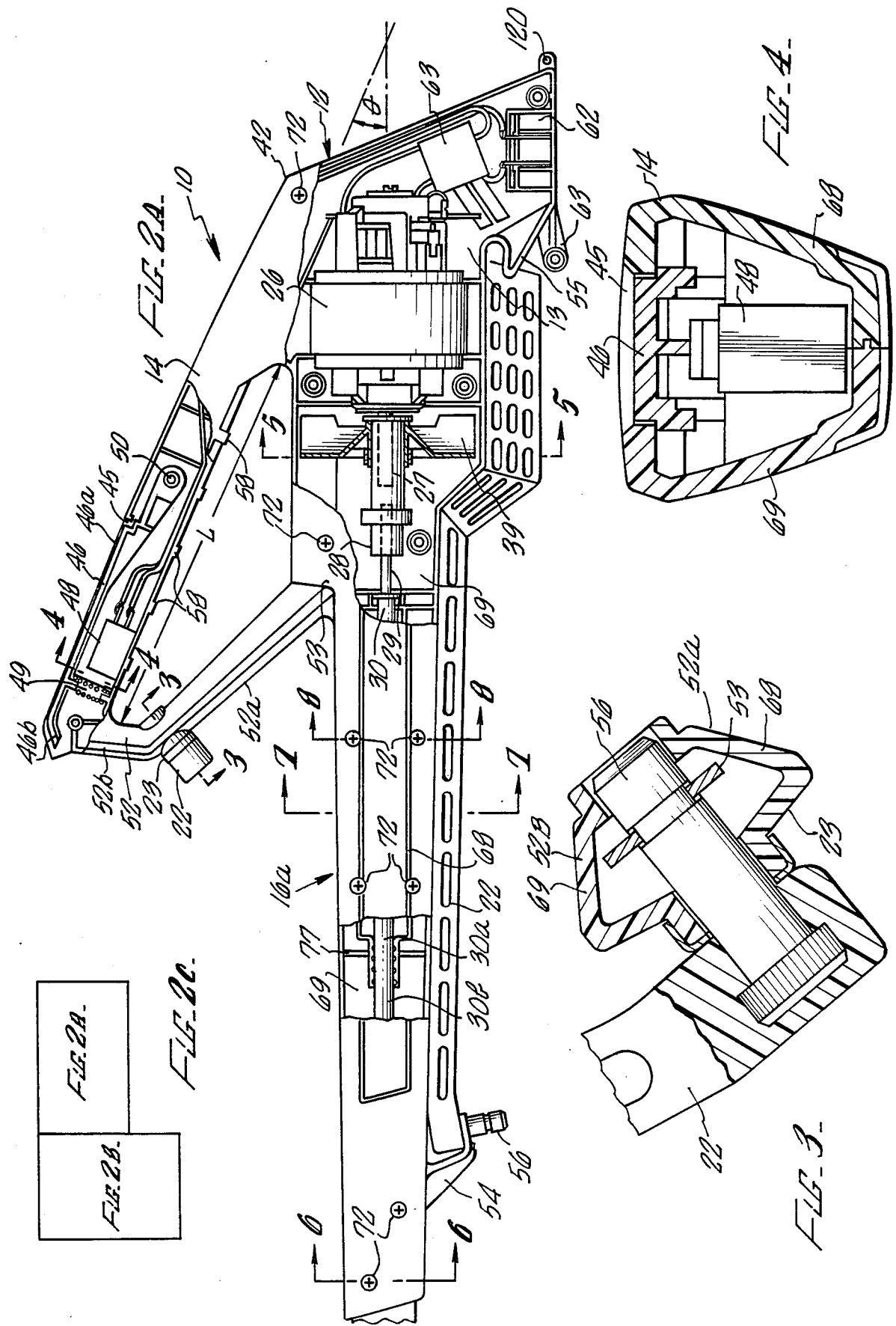

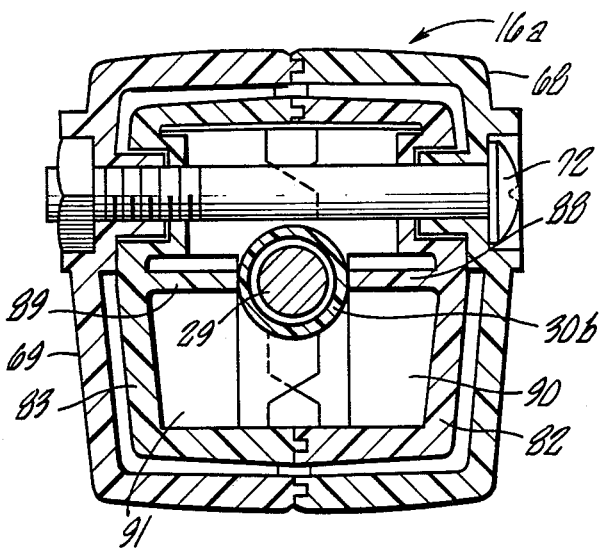
FIG_6_
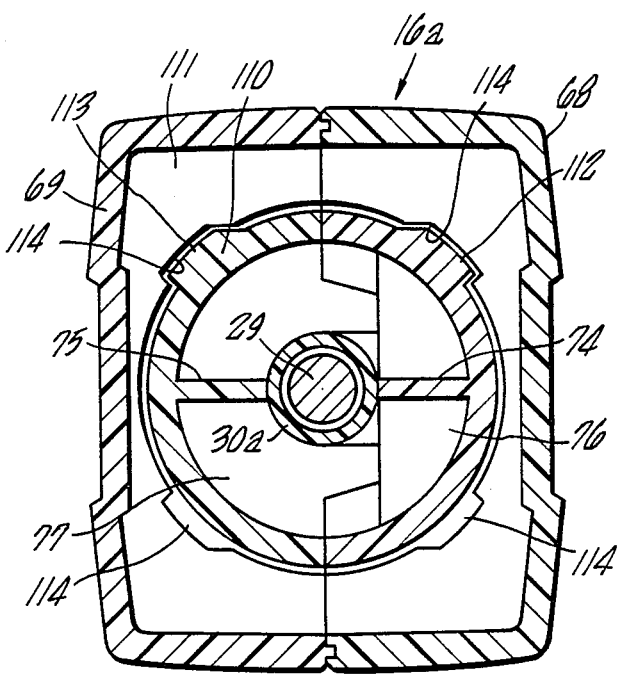
FIG_7_
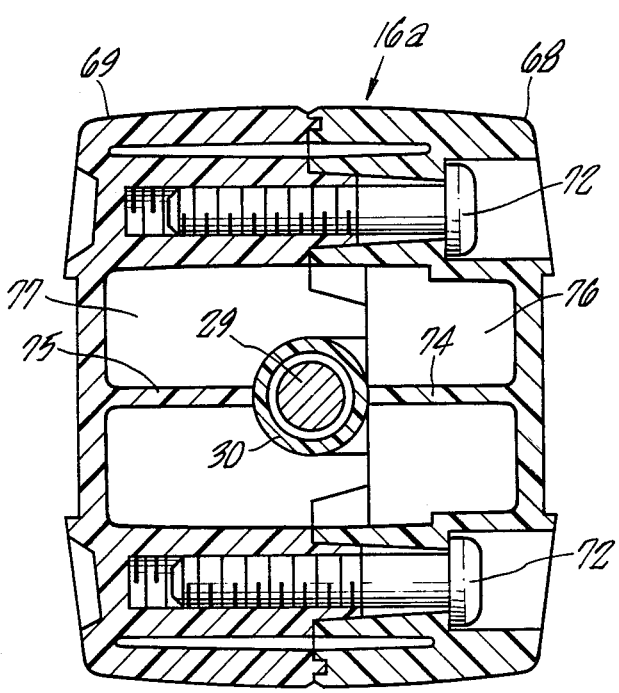
FIG_8_
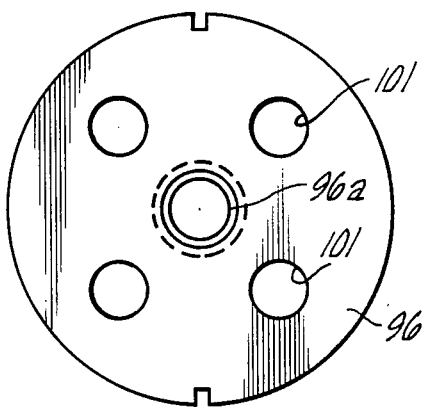
FIG_10_

STRING TRIMMER

BACKGROUND OF THE INVENTION

The present invention relates to power tools for cutting vegetation and more particularly to string trimmers.

String trimmers, sometimes referred to as line or nylon trimmers, are often used for cutting and trimming in areas where other cutting tools cannot conveniently reach or perform the cutting job. Vegetation is cut by a string trimmer with a cutting string or line which is caused to rotate at high speed by a rotating head driven by a motor or similar rotary power source.

Electric powered string trimmers usually include a tubular shaft which extends downwardly from a handle to an electric motor. A cutting head is attached to a rotating shaft of the motor, and this head rotates with the shaft. A short length of cutting string extends from the head during operation of the trimmer. One or more handles are provided on the tubular shaft so that the trimmer can be held and operated by the user. Gasoline engine powered trimmers are similar, but the gasoline engine usually is mounted at one end of the tubular shaft and the cutting head at the other, with a long drive shaft connecting the engine and the cutting head.

String trimmers typically have two handles which are attached to and extend from the tubular shaft so that the user can hold and manipulate the trimmer with both hands while trimming vegetation. During operation, string trimmers are subjected to various forces, such as those caused by the rotation of the motor and cutting head, by movement of the trimmer for cutting by the user, and the like. These and other forces in combination with the relatively unbalanced weight distribution of string trimmers make holding and manipulating such trimmers during operation awkward and frequently necessitate that the user hold the trimmer with both hands during operation.

SUMMARY OF THE INVENTION

The present invention is directed to a string trimmer in which the drive power source, preferably an electric motor, is located in a housing substantially adjacent to, but slightly behind and below, the handle of the trimmer, and includes a tubular body which extends downwardly from the motor housing to a trimmer head. The handle is so located and inclined, or slanted, at such an angle that the user can conveniently operate the trimmer with one hand. The inclined or slanted handle is suitably elongated and enables adjustment of the trimmer up and down with respect to the ground to compensate for different height operators and to compensate for the center of gravity on different size trimmer of this construction. The trimmer also can include a pivoted assist handle which facilitates lifting and guiding the trimmer. Additionally, an improved spindle bearing cooling system is provided. Other features and advantages of the present invention will become apparent hereinafter.

Accordingly, it is an object of this invention to provide an improved string trimmer.

Another object is to provide a string trimmer having an improved handle/motor housing construction and configuration.

An additional object is to provide a string trimmer with an improved assist handle assembly.

A further object is to provide an improved string trimmer spindle bearing cooling system.

BRIEF DESCRIPTION OF THE DRAWINGS

These and other objects and features of the present invention will become better understood through a consideration of the following description taken in conjunction with the drawings in which:

FIG. 1 is a perspective view of an embodiment of a string trimmer of the present invention.

FIGS. 2A and 2B, when placed together as illustrated in FIG. 2C, comprise a cut-away side view of the string trimmer embodiment of FIG. 1, with FIG. 2A showing the upper portion of the trimmer including the motor housing and handle, and FIG. 2B showing the lower portion of the trimmer and including the trimmer head.

FIG. 3 is a cross-sectional view along lines 3—3 of FIG. 2A.

FIG. 4 is a cross-sectional view along lines 4—4 of FIG. 2A.

FIG. 5 is a cross-sectional view along lines 5—5 of FIG. 2A.

FIG. 6 is a cross-sectional view along lines 6—6 of FIG. 2A.

FIG. 7 is a cross-sectional along lines 7—7 of FIG. 2A.

FIG. 8 is a cross-sectional view along lines 8—8 of 2A.

FIG. 9 is a sectional view along lines 9—9 of FIG. 2B.

FIG. 10 is a plan view of a spindle disc.

DETAILED DESCRIPTION OF THE PREFERRED EMBODIMENT

Turning now to FIG. 1, the same is perspective view of a preferred embodiment of a string trimmer of the present invention and comprises an electric motor powered string trimmer 10 including a motor/handle assembly 12 comprising a motor housing 13 and handle 14, a tubular shaft assembly 16, a trimmer head assembly 18 from which extends a cutting string or line 20, and a head/spindle housing 19. The trimmer head assembly 18 is conventional and can be similar to that shown in U.S. Pat. No. 4,490,910.

The user normally operates the trimmer 10 by holding it in one hand by the handle 14 and in a standard operating position so that the cutting line 20 rotates essentially in a plane which is substantially parallel to the plane of the ground as the trimmer head 18 rotates. The configuration and weight distribution of the trimmer 10 are such that the user can operate the trimmer 10 in the standard operating position with one hand and with the user's arm extended substantially straight downward. As can be seen from FIG. 1, most of the motor/handle assembly 12 is disposed behind the hand of the user during standard operation, and most of the tubular shaft assembly 16 and head 18 are located down and out in front of the user's hand. Because of the materials and construction of the components of the trimmer 10, all as will be discussed more fully hereinafter, the overall weight of the trimmer can be made relatively low so that it can be lifted and operated by most adults without any excess exertion. A typical total weight of the trimmer is eight to ten pounds.

The slanted and elongated handle configuration, along with the provision of an elongated trigger switch assembly which will be described later, enables the handle to be grasped at different points along its length so as to compensate for different height operators. Additionally, the configuration and inclination of the handle facilitate compensation for the center of gravity of different size string trimmers which usually employ different size motors and different size heads. The balanced weight distribution of the trimmer, resulting from the relative locations of the handle, motor and trimmer head, prevents the user from being required to compensate for unequal forces and/or torques caused by the rotary forces and gravity which can be exerted on the front and/or rear sections of conventional trimmers during operation. A detachable auxiliary guide handle 22 (note also FIG. 2A) can be attached at fitting 23 at the lower front part of the handle 14 when desired, and this handle is particularly useful on a larger size (e.g. fourteen inch) string trimmer for tilting and guiding the trimmer. In this case, the handle 14 is held in one hand, and the guide handle 22 is held in the other hand of the operator, and the guide handle 22 freely pivots on fitting 23 and can be positioned either to the right or to the left of the handle 14.

Turning now to a more detailed description of a preferred embodiment the present invention, and particularly to FIGS. 2A-2B, the housing 13 of the motor/handle assembly 12 contains a conventional electrical motor 26 having an output shaft 27. The shaft 27 is connected via an adaptor 28, preferably formed of plastic, to a steel flex-shaft 29. The shaft 29 extends through an elongated sleeve 30 which may be formed of plastic and in separate joining sections 30a and 30b, to a spindle 32 disposed in the spindle housing 19 at the lower or bottom end of the trimmer. Felt washers 33 and 34 are provided at the opposite ends of the sleeve 30 to keep grease in the sleeve 30 for lubricating the shaft 29. A conventional string trimmer head 18 is connected to the spindle 32 and driven thereby.

The entire housing of the string trimmer 10 can be formed of clam-shell sections, with the motor/handle assembly 12 housing and upper part of the tubular body 16a as seen in FIG. 2C being formed of two mating halves formed of plastic, and with the lower portion of the tubular body 16b and spindle housing 19 likewise being made of two similarly formed halves. This results in a trimmer of two major sections. A conventional type of guard 36 with a knife for trimming the end of the string 20 is suitably attached to the spindle housing 19. As an alternative, and particularly for larger size string trimmers, the motor/handle assembly 12 housing can be made as one clam-shell section and the majority of the tubular body 16a as seen in FIG. 2A be formed of a separate clam-shell section. This results in the trimmer comprising three major sections. These forms of construction wherein the upper and lower portions (and possibly the center section) of the string trimmer are formed as separate units enable the string trimmer to be packaged in a relatively compact and short package for shipment, and allows the trimmer to be readily assembled by the user after purchase as will become more apparent hereinafter.

The arrangement of the electric motor 26 in the motor/handle housing 12 adjacent to the handle provides several benefits, the most important of which being that this placement allows a balanced string trimmer to be provided as will be discussed in more detail subsequently. Additionally, by locating the motor 26 away from the area of the head 18 and ground, the dust, dirt, pieces of vegetation, and the like which could get into the motor or be sucked into the motor by its cooling system are kept to a minimum for longer life and cooler operation. A fan 39 is attached to the adapter 28 so as to provide cooling of the motor, and louvers (not shown) can be formed at various locations in the motor housing 13 for allowing and facilitating cooling of the motor while hampering the entry of dust, vegetation, and the like from entering the chamber around the motor 26.

Turning to a discussion of the handle 14, as can be seen in FIGS. 1 and 2A, the handle 14 is formed at an angle—(approximately twenty-four degrees) with respect to the longitudinal axis of the trimmer, and therefore when the trimmer is in use (FIG. 1) the handle extends forwardly and at a small downward angle from a back edge 42 of the motor housing 13, which is just above the motor 26, to the front edge of the handle when the trimmer is held in its standard operating position (like in FIG. 1). The angle of the handle 14 from the horizontal plane of the ground is approximately twenty five degrees during standard operation.

Of significance, the handle 14 as seen in FIG. 2A is of elongated construction having a considerable open length L so as to allow the hand of the operator to be placed at various positions along the length L to accommodate use by different height operators. As an example, the length L can be approximately eight inches. The handle 14 has an elongated slot 45 and an elongated trigger 46 is disposed therein and preferably extends from point 46a to a curved outer or forward end 46b. The trigger 46 is pivoted at 50 and operates an on/off switch 48 for the motor 26, and the trigger 46 is normally retained in a switch-off position by a compression spring 49 mounted in the handle. The trigger 46 preferably is formed of plastic, and is long enough (between points 46a and 46b) to allow the trimmer to be turned on by a thumb or finger at any position of the user's hand along the handle. Thus, the user can move his hand along the handle 14 to assume the best and most comfortable position and balance, while still being able to operate the trigger 46 and consequently the on-off switch 48 for the motor 26. The drawing of FIGS. 2A-2B is substantially to scale.

The handle assembly 14 includes a forward section 52 in the form of connected webs 52a-52b, and with the web 52a extending outwardly from the lower end 53 of the motor housing 13 and joining the web 52b which, in turn, is connected to the outer end of the handle 14 near the tip 46b of trigger switch 46. This section provides a mounting for the assist handle 22 via a fitting 23 which is a cylindrical cavity formed into the web section 52a so that the detachable assist handle 22 can be removed from its storage position (as shown at the bottom of the unit in FIG. 2A) in brackets 54 and 55. The assist handle 22 has a shaft 56 which can be snapped into a clip 53 in fitting 23 of the handle section 52a as illustrated in FIG. 3. Alternatively, the assist handle can be suitably bolted or screwed to the forward handle section 52a. The assist handle 22 is seen in FIG. 3 (and also in FIG. 1) as it would be attached to the handle section 52a and extend to the right (into the plane of FIG. 2A) as the handle assembly is viewed in FIG. 2A. Preferably, the assist handle 22 can be rotated freely in the fitting 23 to facilitate lifting as well as better and easier guiding of the trimmer during operation of the trimmer.

The location of the handle 14 with respect to the motor 26 and housing 13 at the upper end, and the tubular body 16 and housing 19 and trimmer head 18 at the lower end of the trimmer provides a relatively balanced weight distribution of the string trimmer as it is held by the operator. The balance point of the trimmer is about midway between the ends of the handle 14 (about at the letter "L" in FIG. 2A), and the center of gravity is approximately on a line perpendicular to the handle and extending between about the letter "L" and the numeral "33" in FIG. 2A.

Thus, the length of the handle and its inclined orientation provide significant advantages. First, the provision of the inclined elongated handle 14 with different parts of the handle at different distances from the plane of the ground during operation of the trimmer allows users of different heights to adjust the vertical distance from the hand to the head 18 of the trimmer so the user's arm can be in a comfortable, downwardly extended position. Although the positioning of the hand at one end or the other of the handle 14 will affect the balance of the trimmer slightly, the width of the user's hand and the relatively light weight materials which can be used in construction of the trimmer minimize any resulting imbalance. Second, the length of the handle 14 from back to front (essentially in a horizontal direction) allows the user to adjust the balance of the trimmer when it is moved away from a standard operating position during use. It is of course important that the trigger 46 likewise be elongated so that it can be operated by the thumb or finger of the user when the user's hand is at any reasonable operating position along the handle 14. Furthermore, the orientation of the handle at approximately twenty five degrees from the horizontal plane (ground) during operation tends to prevent the handle from slipping in the hand during use and, additionally, protrusions 58 can be provided on the underside of the handle to be gripped by the fingers of the user to minimize such slippage.

Turning now to a further discussion of the construction of the housing of the string trimmer, as noted earlier, the motor/handle housing 12 and upper part of the tubular housing assembly 16a preferably are formed in two halves, as are the lower tubular section 16b and spindle housing 19 as shown in FIG. 2B. The cross-sectional views of FIGS. 4, 5, 6 and 7 better illustrate the two halves of the housing of the upper part of the trimmer as shown in FIG. 2A, and cross-sectional views of FIGS. 6 and 9 further illustrate the lower tubular section 16b of FIG. 2B, and how it mates with the upper tubular section 16a. The housing of the upper portion or section of the trimmer as shown in FIG. 2A can be formed by two molded plastic halves 68 and 69. The half-section 68 is seen in the plan view of FIG. 2A, and is seen on the right side of the cross-sectional views of FIGS. 3–8. Similarly, the second half-section 69 is essentially hidden in FIG. 2C (except at the cut-away sections of side 68), but it is seen on the left-hand side in the cross-sectional views of FIGS. 4–8. The two halves 68 and 69 are held together by suitable screw fasteners 72. The components within the housing (e.g., the motor 26, switch 48, trigger 46, sleeve 30, etc.) can be retained within the housing halves 68–69 in any suitable manner. For example, the motor 26 can be retained by suitable screw fasteners and/or ribs and spacers. Of particular interest is the manner in which the sleeve 30 for the flex/shaft 29 is retained and supported. The housing halves 68 and 70 have suitably spaced ribs which engage and hold the sleeve 30 in place. For example, several longitudinal ribs 74–75 are molded in the respective sides 68–69, as are several transverse ribs 76–77 (note in particular FIGS. 7 and 8).

The housing of the lower section of the trimmer as seen in FIG. 2B likewise is formed of two halves 82 and 83 as seen in FIGS. 2B, 6 and 9. The halves are held together by suitable screw fasteners 85. Similar longitudinal ribs 88–89 and transverse ribs 90 and 91 are used in the lower housing to support the sleeve 30b.

Turning to the spindle housing 19 and drive system for the string trimmer head 18, the flex shaft 29 rotates a spindle 32 which is seen within the spindle housing 19 in FIG. 2B. The spindle 32 is mounted in a pair of circular spindle plates 96 and 97 as seen in FIG. 2B, one of which is shown in plan view in FIG. 10. Each plate has attached or press fit therein a bearing 96a and 97a. The lower end of the flex shaft 29 is keyed to the inside of the spindle so as to cause the spindle 32 to rotate within the bearings 96a and 97a. Preferably, a steel thrust washer is disposed between the lower end of the spindle 32 and the upper end of the bearing 97a. The lower end of the spindle 32 is keyed or otherwise secured in any suitable manner to the rotary portion (either spool or cover) of the string trimmer head 18 in a conventional manner. The plates 96 and 97 are supported and fixed in a suitable rib structure of the two halves 82 and 83 of the spindle housing 19. The rib structure can include longitudinal ribs 98 and transverse ribs 99 as seen in FIG. 2B. Each plate 96 and 97 as seen in FIG. 10 may be stamped out of steel. They both support the spindle 32 and serve as heat sinks for heat dissipation for the spindle bearings and spindle. Holes 101 allow air flow provided by fan blades 102 of the head 18 to aid in cooling the bearings 96a and 97a, the spindle 32 and plates 96 and 97.

The guard 36 preferably is formed of plastic and is of conventional configuration so as to be snapped or twisted on the housing 19, and includes a knife (not shown) for insuring that the string or line 20 is cut off at the proper operating length in a conventional manner. The guard 36 sticks out toward the rear of the string trimmer in the direction of the feet of the user of the string trimmer.

The upper and lower housing sections of the trimmer as seen in FIGS. 2A and 2B are secured together with the lower tubular section 16b telescoping into the upper tubular section 16a as best seen in FIG. 6. In this regard, preferably the sleeve 30 is separated into the upper and lower pieces 30a and 30b so that the string trimmer can be shipped with the upper trimmer section as basically seen in FIG. 2A being shipped separate from the lower section of FIG. 2B. Also, the flex shaft 29 would be packed separately. For assembly, the flex shaft 29 is inserted into the sleeve 30a in the upper section of FIG. 2A and mated with the adaptor 28, and inserted into the sleeve 30b of the lower section of the trimmer as shown in FIG. 2B and mated with the spindle 32. The lower tubular section 16b is inserted into the upper tubular section 16a and bolted together as seen in FIG. 6.

FIG. 7 illustrates, along with FIG. 2A, a modification of the tubular section 16a so as to allow the lower portion of the string trimmer below the cross-sectional line 7—7 of FIG. 2A to be rotated in ninety degree increments with respect to the upper section. This can be done to allow the upper portion of the string trimmer to be held in a standard operating position as shown in FIG. 1, but with the spindle housing 19 and head 18 angled in different orientations for different types of trimming and edging. For example, rotation of the lower section in one direction by ninety degrees will allow the head and consequently the string to rotate and spin in substantially a vertical plane for edging. For this modification, the upper housing of the string trimmer basically terminates at the section line 7—7 of FIG. 2A, and the lower section commences there, or a third intermediate section between the upper and lower housing sections commences there. FIG. 7 illustrates a substantially cylindrical member 110 within the upper motor housing section which can mate with a solid rib structure 111 of a lower or intermediate tubular section so as to allow the upper and lower sections to rotate relative to each other. Suitable bumps 112 and 113 can mate with slots 114 in 111 to serve as detents at ninety degree intervals.

As noted, the entire housing can be molded from a suitable plastic, and the use of the plastic adapter 28 between the motor shaft 27 and the flex shaft 29 provides electrical isolation from ground. The sleeve 30 preferably is formed of nylon, and preferably is formed in two sections 30a and 30b as noted earlier to facilitate packaging of the trimmer in two or three sections, and to facilitate rotation of the lower part of the trimmer shown in FIG. 2B with respect to the upper part of the trimmer as described in conjunction with the discussion of FIG. 7.

An electrical receptacle 62 is provided for supplying power to the trimmer and the same is connected via suitable electrical wires through the switch 48 to the motor 26. In the event a DC motor is used as the motor 26, an AC-DC rectifier 63 may be provided for suitably rectifying the AC power. A strain relief 63 can be provided for the electrical cord (not shown). An eyelet 120 can be provided for a hanger hook to facilitate storing the trimmer.

Reference is made to design patent application Ser. No. 07/121,617 entitled String Trimmer and filed concurrently herewith in the names of Edward J. Pilatowicz and Anthony Carsello, the disclosure of which is incorporated herein by this reference. This design application relates to the aesthetic design of the present string trimmer.

While embodiments and applications of the present invention have been shown and described, those skilled in the art will recognize that further modifications are possible without departing from the inventive concepts herein and all such modifications are intended to be covered within the scope of the appended claims.

What is claimed is:

1. A string trimmer comprising
   a housing containing a rotary power source such as an electric motor for supplying power to a string trimmer head,
   string trimmer head housing means including spindle means for driving a string trimmer head for rotation for trimming vegetation and the like,
   connecting housing means comprising a substantially tubular housing connecting the motor housing and the head housing means, and including drive means for interconnecting the power source and spindle means in the head housing means for driving the spindle means from the power source for driving a string trimmer head, and
   handle means attached to and extending from the motor housing in the direction of the tubular housing, the handle means comprising a handle inclined at an angle with respect to the longitudinal axis of the tubular housing, and the head housing means being disposed at an angle with respect to the axis of the tubular housing so that, during operation of the string trimmer, the handle can be grasped by the hand of a downwardly extending arm of the user and the plane of rotating string from the trimmer head will be substantially parallel to or at a small angle with respect to the ground, said handle being elongated to allow the same to be grasped at different positions along its length so as to help accommodate users of different heights and to allow a grasping position which results in a balanced weight distribution between the motor housing and the trimmer head housing.

2. A string trimmer as in claim 1 including auxiliary assist handle means pivotally attached to the handle means for use by a second hand of a user for facilitating tilting and guiding the string trimmer.

3. A string timmer as in claim 1 wherein said handle includes elongated trigger switch means for allowing the user to turn on and off an electric motor of the trimmer as the handle is grasped at different positions along its length.

4. A string trimmer as in claim 1 wherein said elongated handle is integrally formed with the housing for the rotary power source and at an angle of approximately twenty-four degrees with respect to the longitudinal axis of said tubular housing.

5. A string trimmer as in claim 1 wherein said string trimmer head housing means includes plates for supporting and allowing rotation of said spindle means, said plates also forming heat sinks for said spindle means for facilitating cooling thereof.

6. A string trimmer comprising
   a housing containing a rotary power source such as an electric motor for supplying power to a string trimmer head,
   string trimmer head housing means including spindle means for driving a string trimmer head for rotation for trimming vegetation and the like,
   a string trimmer head attached to said spindle means,
   connecting housing means comprising a substantially tubular housing connecting the motor housing and the head housing means, and including drive means for interconnecting the rotary power source and spindle means in the head housing means for driving the spindle means from the power source for driving the string trimmer head, and
   handle means attached to and extending from the motor housing in the direction of the tubular housing, the handle means comprising a handle inclined at a small angle with respect to the longitudinal axis of the tubular housing, and the head housing means being disposed at an angle with respect to the axis of the tubular housing so that, during operation of the string trimmer, the handle can be grasped by the hand of a downwardly extending arm of the user and the plane of rotating string from the trimmer head will be substantially parallel to or at a small angle with respect to the ground, said handle being elongated to allow the same to be grasped by the hand of the user at different positions along its length so as to help accommodate users of different heights and to allow a grasping position which results in a balanced weight distribution between the motor housing and the trimmer head housing.

7. In a string trimmer having a rotary power source for supplying power to a string trimmer head, a housing/handle assembly comprising
   a housing containing a rotary power source having a longitudinal axis, and handle means attached to and extending from the housing at a small angle with respect to the longitudinal axis of a power source, the handle means comprising a handle inclined at an angle with respect to said longitudinal axis for allowing the handle to be conveniently grasped by the hand of a downwardly extending arm of a user, said handle being elongated to allow the same to be grasped at different positions along its length by the hand of the user to help accommodate users of different heights and to allow a grasping position which results in a balanced weight distribution between the housing containing the rotary power source and the string trimmer head, and said handle including elongated trigger switch means for allowing the user to turn on and off the rotary power source as the handle is grasped at different positions along its length.

8. A housing/handle assembly as in claim 7 wherein said elongated handle is integrally formed with the housing and said small angle is approximately twenty-four degrees.

9. A housing/handle assembly as in claim 7 wherein the handle means has pivotally attached thereto auxiliary assist handle means for use by a second hand of a user for facilitating tilting and guiding.

10. A string trimmer comprising
a housing containing a rotary power source for supplying power to a string trimmer head,
string trimmer head housing means including spindle means for driving a string trimmer head for rotation for trimming vegetation and the like,
connecting housing means connecting the motor housing and the head housing means, and including drive means for interconnecting the rotary power source and spindle means in the head housing means for driving the spindle means from the power source for driving a string trimmer head, and
handle means attached to and extending from the motor housing in the direction of the connecting housing means, the handle means comprising a handle inclined at a small angle with respect to the longitudinal axis of the connecting housing means, so that, during operation of the string trimmer, the handle can be grasped by the hand of a downwardly extending arm of the user, said handle being elongated in the general direction of the connecting housing means to allow the handle to be grasped by the hand of the user at different positions along its length so as to facilitate use of the string trimmer by users of different heights and to allow a grasping position which results in a balanced weight distribution between the housing containing the rotary power source and the string trimmer head.

11. A string trimmer as in claim 10 including auxiliary assist handle means pivotally attached to the handle means for use by a second hand of a user for facilitating tilting and guiding the string trimmer.

12. A string trimmer as in claim 10 wherein said handle includes elongated trigger switch means for allowing a user to turn on and off an electric motor of the trimmer as the handle is grasped at different positions along its length.

13. A string trimmer as in claim 10 wherein said elongated handle is integrally formed with the housing for the rotary power source and at an angle of approximately twenty-four degrees with respect to the longitudinal axis of said connecting housing means.

* * * * *